No. 756,346. PATENTED APR. 5, 1904.
M. FARRELL.
FAUCET.
APPLICATION FILED JUNE 20, 1903.
NO MODEL.
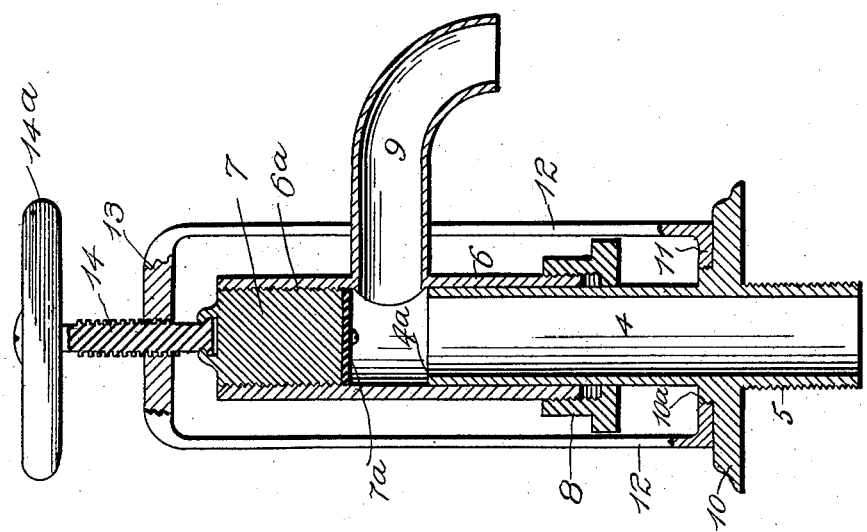
Witnesses
F. A. Barrow.
M. A. Schmidt.
Inventor
Michael Farrell
by Milo B. Stevens & Co.
Attorneys No. 756,346. Patented April 5, 1904.

UNITED STATES PATENT OFFICE.

MICHAEL FARRELL, OF CHICAGO, ILLINOIS.

FAUCET.

SPECIFICATION forming part of Letters Patent No. 756,346, dated April 5, 1904.

Application filed June 20, 1903. Serial No. 162,303. (No model.)

*To all whom it may concern:*

Be it known that I, MICHAEL FARRELL, a citizen of the United States, residing at Chicago, in the county of Cook and State of Illinois, have invented certain new and useful Improvements in Faucets; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in faucets, and has for its object a construction whereby a hammering or pounding is prevented, there being a free and unobstructed passage for the water or other fluid when the valve is open.

A further object is to provide a faucet of simple construction having no complicated parts to get out of order.

With this and other objects in view my invention consists in a novel construction and combination of parts hereinafter described and claimed.

In the accompanying drawings, Figure 1 is an elevation of my invention. Fig. 2 is a vertical section thereof.

Referring specifically to the drawings, 4 indicates a pipe having a threaded end 5 for attachment to a supply-pipe.

At 6 is indicated a tube which is slidable vertically on the pipe 4. The upper end of this tube is interiorly threaded, as at $6^a$, to receive a cylindrical plug 7, which constitutes a valve having a seat $4^a$ on the upper edge of the pipe 4. The valve has on its face a rubber or leather disk $7^a$, so as to make a water-tight joint when it is seated. The lower end of the tube 6 has a suitable packing-nut 8.

At 9 is indicated a spout which is made integral with or otherwise secured to the tube 6.

At 10 is indicated a collar on the pipe 4, which is threaded, as at $10^a$, to receive a ring 11. Projecting upward from this ring are standards 12, which are joined at their upper ends by a yoke 13, which supports the screw valve-stem 14, having a hand-wheel $14^a$. The valve-stem is secured to the valve 7 and by turning the hand-wheel the valve is forced to its seat, shutting off the water. When the hand-wheel is turned in an opposite direction, the valve will be unseated, permitting the water to flow from the pipe 4 out through the spout 9. It will be apparent that the tube and spout move with the valve.

The valve can be firmly seated so that there will be no leakage and is readily removable for inspection or repair.

It is to be understood that minor changes and modifications may be made without departing from the nature and spirit of the invention.

Having thus described my invention, what is claimed as new, and desired to be secured by Letters Patent, is—

A faucet comprising a pipe having a valve-seat at its end, a tube slidable on the pipe and having a discharge-spout and a valve, a threaded collar on the pipe, a ring screwed on the collar, standards extending upwardly from the ring, and a screw valve-stem supported in the standards for operating the valve, substantially as described.

In testimony whereof I affix my signature in presence of two witnesses.

MICHAEL FARRELL.

Witnesses:
SIGNA FELTSKOG,
H. G. BATCHELOR.